(12) United States Patent
Mutschler

(10) Patent No.: US 9,954,932 B2
(45) Date of Patent: Apr. 24, 2018

(54) APPARATUS AND METHOD FOR TRANSFERRING EVENT DETECTOR PROCESSES

(75) Inventor: Christopher Mutschler, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 665 days.

(21) Appl. No.: 14/354,957

(22) PCT Filed: Oct. 31, 2011

(86) PCT No.: PCT/EP2011/069159
§ 371 (c)(1),
(2), (4) Date: May 28, 2014

(87) PCT Pub. No.: WO2013/064171
PCT Pub. Date: May 10, 2013

(65) Prior Publication Data
US 2014/0280448 A1    Sep. 18, 2014

(51) Int. Cl.
*H04L 29/08*    (2006.01)
*G06F 9/48*    (2006.01)
(Continued)

(52) U.S. Cl.
CPC ........... *H04L 67/10* (2013.01); *G06F 9/4856* (2013.01); *G06F 9/542* (2013.01); *G06F 9/5088* (2013.01)

(58) Field of Classification Search
CPC ... H04L 67/10; H04L 67/1027; H04L 67/104; G06F 4/4856; G06F 4/542; G06F 4/5088
See application file for complete search history.

(56) References Cited

U.S. PATENT DOCUMENTS 8,078,609 B2 * 12/2011 Black ............... H04L 67/10
707/713
8,478,743 B2 * 7/2013 Chandramouli .. G06F 17/30463
707/718
(Continued)

FOREIGN PATENT DOCUMENTS

CN    1698388 A    11/2005
CN    101013387 A    8/2007
(Continued)

OTHER PUBLICATIONS

Endler, Markus et al., "General Approaches for Implementing Seamless Handover", POMC '02, Proceedings of the 2nd ACM International Workshop on Principles of Mobile Computing, pp. 17-24, Toulouse, France, Oct. 30, 2002.
(Continued)

*Primary Examiner* — Patrice L Winder
(74) *Attorney, Agent, or Firm* — 2SPL Patentanwaelte PartG mbB; Mani Arabi

(57) ABSTRACT

Embodiments relate to methods (900) and apparatuses (800) transferring a first event detector process of a first node (704-1) of a distributed computing system (300; 700) to a second event detector process of a second node (704-2) of the distributed computing system (300; 700), the second node (704-2) being different from the first node (704-1). The apparatus (800) comprises means (802) for copying a process content of the first event detector process to the second event detector process, means (804) for coordinating input events of the first event detector process such that the input events of the first event detector process are processed in parallel at both the first and the second event detector processes, and means (806) for verifying whether the input events of the first event detector process, which are processed in parallel at both the first and the second event
(Continued)

detector process, lead to identical output events at both the first and the second event detector processes.

15 Claims, 6 Drawing Sheets

(51) Int. Cl.
*G06F 9/50* (2006.01)
*G06F 9/54* (2006.01)

(56) References Cited

U.S. PATENT DOCUMENTS

| | | | | |
|---|---|---|---|---|
| 8,479,216 B2* | 7/2013 | Lakshmanan | ......... | G06F 9/5088 709/201 |
| 8,521,974 B2* | 8/2013 | Musolff | ............. | G06F 11/1443 711/162 |
| 9,009,234 B2* | 4/2015 | Mitchell | ............... | H04L 1/1809 709/203 |

FOREIGN PATENT DOCUMENTS

| | | |
|---|---|---|
| JP | 08137691 A | 5/1996 |
| JP | 09244984 A | 9/1997 |
| JP | 2011128738 A | 6/2011 |
| WO | WO9917478 A1 | 4/1999 |
| WO | 2004064292 A2 | 7/2004 |
| WO | 2011057874 A2 | 5/2011 |
| WO | 2011127059 A1 | 10/2011 |

OTHER PUBLICATIONS

Banavar et al, "An Efficient Multicast Protocol for Content-Based Publish-Subscribe Systems," IBM J. Watson Research Center, Hawthorne, NY, pp. 1-9.

Defago et al, "Total Order Broadcast and Multicast Algorithms: Taxonomy and Survey," ACM Computing Surveys, vol. 36, No. 4, Dec. 2004, pp. 372-421.

Floyd et al, "A Reliable Multicast Framework for Light-weight Sessions and Application Level Framing," IEEE/ACM Transactions on Networking, Dec. 1997, pp. 1-19.

Garcia-Molina et al, "Ordered and Reliable Multicast Communication," ACM Transactions on Computer Systems, vol. 9, No. 3, Aug. 1991, pp. 242-271.

Opyrchal et al, "Exploiting IP Multicast in Content-Based Publish-Subscribe Systems," J. Sventek and G. Coulson (Eds.): Middleware 2000, Springer-Verlag Berlin Heidelberg 2000, pp. 185-207.

Mutschler et al, "Distributed Event Processing for High Data Rate Sensor Streams," ACM, pp. 1-12.

* cited by examiner

|  | occurred | detected | received at event detector |
|---|---|---|---|
| event A | 10 | 14 | 16 |
| event B | 12 | 13 | 15 |
| event C | 14 | 14 | 15 |
| event D | 15 | 17 | 18 |

APPARATUS AND METHOD FOR TRANSFERRING EVENT DETECTOR PROCESSES

Embodiments of the present invention generally relate to data networks and, in particular, to apparatuses and methods for transferring event detector processes between different nodes of a distributed computing system.

BACKGROUND

Sensor networks, such as, for example, wireless sensor networks, have a wide range of applications. For example, wireless sensor networks of various technologies may be used for locating purposes, such as locating humans and/or other objects. Here, "locating" means the detection or determination of a geographical location or position. Some specialized locating or position tracking systems may be used for locating players and other objects (e.g. a ball) in sport events, such as, for example, soccer, American football, rugby, tennis, etc.

With using gathered geographic location or positioning data of players and/or a ball it is possible to derive statistical information related to the whole sports event, for example a soccer match, or related to individual teams or players. Such derived statistical information may be interesting for various reasons. On the one hand, there are various commercial interests as certain statistics and their analysis may be of particular relevance for spectators in a stadium and/or in front of a television set at home. Hence, providing certain statistics may raise more interest in sport events. On the other hand, statistical data derived from the raw positioning data may as well be used for training purposes. Here, an opponent and/or the behavior of the own team may be analyzed as well as the performance and/or health condition of individual players.

The aforementioned locating or position tracking systems may be based on various technologies. For example, location information may be determined based on the evaluation of wireless radio signals and/or magnetic fields. For this purpose transmitters and/or receivers, generally also denoted as sensors, may be placed at the individual objects (e.g. players, ball, etc.) to be located by the system. Corresponding reception and/or transmission devices may also be mounted to predetermined locations around a geographical area of interest, as e.g. a soccer field. An evaluation of signal strengths, signal propagation times, and/or signal phases, just to name a few possible technical alternatives, may then lead to sensor data streams indicative of the geographic position of individual players or objects at different time instants. Typically, a geographic location data sample is associated with a time stamp indicating at which time an object was located at which geographic position. With this combined information kinematic data, like velocity (speed), acceleration, etc. may as well be provided in addition to the location data comprising, for example, x-, y-, and z-coordinates. In the sequel of this specification the location and kinematic data delivered by the localization sensor system will also be referred to as (raw) sensor data.

In a particular example of a wireless tracking system people or objects may be equipped with tiny transmitters, which may be embedded in footwear, uniforms and balls and whose signals are picked up by a number of antennas placed around the area under observation. Receiver units process the collected signals and determine their Times of Arrival (ToA). Based on a calculation of the differences in propagation delay, each transmitter's position is then continuously determined. In addition, a computer network integrated with the wireless tracking system may analyze the position or sensor data so as to detect specific events. Operating in the 2.4 GHz band, the tracking system is globally license-free.

Based on the raw sensor data streams outputted from the locating or position tracking system so-called "events" may be detected. Thereby an event may be defined to be an instantaneous occurrence of interest at a point of time. In general, an event is associated with a change in the distribution of a related quantity that can be sensed. An event may be a primitive event, which is directly based on sensor data (kinematic data) of the tracking system, or a composite event, which is based on previously detected other events instead. That is to say, a composite event is not directly depending on raw sensor data but on other events. In ball game applications, an event may, for example, be "player X hits ball" or "player X is in possession of ball". More complicated events may, for example, be "offside" or "foul".

The detection of events based on underlying sensor data streams has raised increased interest in the database and distributed systems communities in the past few years. A wide range and ever growing numbers of applications nowadays, including applications as network monitoring, e-business, health-care, financial analysis, and security or the aforementioned sport-event supervision, rely on the ability to process queries over data streams that ideally take the form of time ordered series of events. Event detection denotes the fully automated processing of raw sensor data and/or events without the need of human intervention, as in many applications the vast quantity of supplied sensor data and/or events cannot be captured or processed by a human person anymore. For example, if high speed variations of players or a sports object, e.g. a ball, are to be expected, the raw sensor (locating or position tracking) data has to be determined at a sufficiently high data rate by the underlying (wireless) sensor network. Additionally, if there is a high number of players and/or objects (e.g. in soccer there are 22 players and a ball) to be traced the amount of overall geographic location and kinematic data samples per second can become prohibitively high, in particular with respect to real-time event processing requirements.

Hence, even if raw sensor and/or event data streams are analyzed and signaled fully automated, there may still be by far too many information, which is possibly not even of any interest in its entirety. In the future this problem will even get worse as more and more devices will be equipped with sensors and the possibility to provide their determined sensor data to public networks such as the Internet for (e.g., weather or temperature data determined by wireless devices like smart phones). For this reason the amount of sensor data to be processed further into certain events of interest will rapidly grow. Automated event detection may provide remedy for this by trying to aggregate the raw sensor data piece by piece and to determine more abstract and inter-dependent events, which may transfer by far more information than the raw sensor data itself. For example, beside the aforementioned soccer-related examples, such determined events could include "car X is located at crossing Y" or "traffic jam on route X".

The problem that arises in automated event detection is the required computing power for performing event detection on possibly massively parallel sensor and/or event data streams—and all this under at least near real-time processing requirements. This problem may be solved by parallelization of event detectors, which may, for example, run on different network nodes of a computer network, which may, for example, communicate via Ethernet. Thereby an event detector automatically extracts a certain event of interest from an event or sensor data stream according to a user's event specifications. Individual event detectors may be distributed over different network nodes of a data network, wherein the different event detectors communicate using events and/or sensor data travelling through the network using different network routes and branches. Thereby, raw sensor data and/or event may be transported in data packets according to some transport protocol, like, e.g., UDP (User Datagram Protocol), TCP (Transmission Control Protocol)/IP (Internet Protocol), etc. This concept, however, causes new problems with respect to possibly unbalanced computational load among different network nodes and with respect to the synchronization of event data streams within the network. Without suitable countermeasures the computational loads among different network nodes are unbalanced and individual sensor and/or event data streams in the network are not time-synchronized to each other, which means that individual events may reach an event detector out of their original temporal order and thereby lead to false detected results.

Let us look at an exemplary soccer-scenario, wherein a plurality of parallel automatically operating event detectors is supposed to detect a pass from player A to player B. In order to detect said "pass"-event, the following preceding event sequence is required:
1. "player A is in possession of ball",
2. "player A kicks ball",
3. "ball leaves player A",
4. "ball comes near player B",
5. "player B hits ball"

The event detection for event "player X kicks ball" may be based on the event sequence "player X near ball" and a detected acceleration peak of the ball. There are the following alternatives for setting up an automated event detector for said event "player X kicks ball":

We may wait for individual required events—one after the other. If we have seen all the required events in the correct (temporal) order (here, any abortion criterions are disregarded for the sake of simplicity) we can say that we have seen or experienced a pass. However, for complex applications the detection of all the required events does not necessarily take place on a single network node or a CPU (Central Processing Unit) due to the parallelization of event detectors. For this reason it is not necessarily guaranteed that individual required events reach the event detector in the correct required order. This may, for example, be due to network jitter, varying and/or unbalanced CPU-load or increased network load.

Hence, we could try to buffer events and then search the buffer for the correct event pattern. But which buffer size should be used? If we say a pass has to happen within maximum 5 seconds we would have to consider events within a time period of maximum 5 seconds after the first relevant event until we have either detected the pass or until we abort. However, it is also possible that the last relevant event is computationally quite complex, what requires a small additional buffer. But what is the size of this additional buffer? And what is the buffer-size related to composite event detectors that require the "pass"-event as an input event? The event signaling delays are dependent on an entire system/network configuration, i.e., the distribution of the event detectors, as well as the network- and CPU-load. Neither the final system configuration nor the load scenario may be foreseen at the time of compilation.

Most existing event detection systems do not consider the aforementioned event signaling delay and or load balancing issues, as in a lot of cases event processing or propagation delays are not relevant. However, this is not the case particularly for highly complex real-time event detection systems, such as in financial or position tracking scenarios.

The following soccer-related example exemplifies the event delay problem on the basis of a frequently required "offside"-event detection scenario, which is schematically illustrated in FIG. 1.

Player 100 passes the ball 110 forward to his team mate 120. At the true (real) time of the pass, i.e., the time at which the ball 110 experiences an acceleration swing or peak (see FIG. 1, left), player 120 is situated in offside position by a few centimeters. Hence, the game would have to be interrupted.

However, in order to be able to distinguish between a direct pass or a dribbling of the first player 100, the pass from the first player 100 to the second player 120 may only be detected when the ball 120 really leaves the first player 100. Due to a limited data rate of the sensor data this distinguishing decision may take an additional "natural" delay of at least a few milliseconds. After this natural delay the second player 120 may, however, not be in offside-position anymore (see FIG. 1, right).

Here, just considering the temporal order of the participating automatically generated events is not enough for making the offside decision. Moreover, they have to be sorted. Not only the event computation time or network propagation delay is relevant, but also causal, real-time variations that have to be considered. The time-stamp of the detected pass event has to be reset to the past, i.e. the moment in which the ball experiences an acceleration peak.

Beside demanded general system stability it is desirable to ensure for a possibly equal computational load distribution in a distributed computing system also due to the importance of the temporal order of events for correct follow-up decisions or events.

SUMMARY

For detecting events, such as primitive and/or composite events, various event detectors may be running on different nodes of a distributed computing system. Thereby, a primitive event is typically solely based on or derived from (raw) sensor data, whereas a composite event is typically based on primitive events or other preceding composite events. The sensor data may stem from a sensor network coupled to the distributed system, wherein the sensor network may in particular be a wireless location tracking network or system, according to some embodiments. In this case the sensor data may comprise kinematic data, the kinematic data comprising geographical location data samples, velocity data samples, and/or acceleration data samples, wherein the individual data samples correspond to predefined sample time intervals, respectively. Hence, the events may be detected by event detectors based on previous events and/or parallel sensor data streams stemming from a geographical locating system.

Such event detectors may cause different loads on their respective associated nodes and/or the whole distributed computing system, depending on the condition of the system and/or depending on the computational complexity of the event detector's underlying algorithm and/or the sensor data to be analyzed. Hence, in a scenario of changing premises or conditions of an original system configuration, an original distribution of the event detectors onto the various network nodes could turn out to be suboptimal with respect to computational load balance or could even lead to a crash of the distributed computing system.

Such undesirable load unbalances may be counteracted by embodiments of the present invention. If, for example, at least one event delay reaches a prohibitively high value, this may be an indicator for that fact a source event detector process, from which the corresponding event reaches a destination event detector process, is overloaded or experiences some other problems. In such a scenario it may be desirable to transfer or relocate the malicious source event detector process to some other hardware resource of the distributed computing system. For example, the malicious source event detector process may be transferred from its current node to another, physically separate and different node of the distributed computing system, which has more hardware resources available.

For this purpose, embodiments of the present invention provide an apparatus for transferring a first event detector process of a first node of a distributed computing system to a second event detector process of a second node of the distributed computing system. The second node is physically different from the first node. The apparatus comprises means for copying a process content of the first event detector process to the second event detector process, means for coordinating input events of the first event detector process such that the input events of the first event detector process are processed in parallel at both the first and the second event detector processes, and means for verifying whether the input events of the first event detector process, which are processed in parallel at both the first and the second event detector process, lead to identical output events at both the first and the second event detector processes.

According to some embodiments, an event detector process is to be understood as an instance of a computer program that is being executed on a node of the distributed system. An event detector process comprises the computer program's program code and its current activity. The distributed system may be a distributed computer network or a multicore processor, for example. In case of a computer network, a node, i.e. network node, may comprise computer device or a processing unit (e.g. CPU) thereof communicating with other network nodes via Ethernet, for example, or some other form of networking technology.

According to some embodiments, an event detector process may comprise a state machine, which may be understood as a behavioral model used to design an event detector process' underlying computer program. A state machine is composed of a (finite) number of states associated to transitions, wherein transition is a set of actions that starts from one state and ends in another (or the same) state. A transition is started by a trigger, wherein such a trigger may, for example, be a primitive or composite event or raw sensor data input to the event detector process. Hence, according to aspects of the present invention, an event detector process may comprise a state machine and an event detector process' content or memory may reflect a current state of said state machine, as, for example, individual variables or arrays or variables. For event detector processes the state machine may be a software-based state machine, e.g. a Unified Modeling Language (UML) state machine.

The apparatus for transferring, which may also be referred to as transfer apparatus, may e.g. be implemented as a central entity of the distributed computing system. Said central entity may have information on more or all delays of event signals traveling along different routes in the distributed system. Thereby, an event's delay may, for example, be due to different jitter, different processing capabilities and/or different signal propagation times of the different network paths or routes. Alternatively or additionally, the central transfer apparatus may have information on more or all load situations (e.g. CPU-load) of individual nodes and/or information indicative of an overall system load. Hence, according to some embodiments, the transfer apparatus may have overall system parameter knowledge. According to yet other embodiments, the transfer apparatus may also be non-central, i.e., distributed over a plurality of network nodes. In this case, a network node may only have limited information indicative of its own load or event delay situation. Hence, overall system parameter knowledge may not be available in some embodiments.

The system's event detector processes may be distributed among the network nodes according to a certain event detector process distribution criterion, which may be more or less optimal, depending on the overall system parameter or system situation knowledge level of the transfer apparatus. A central transfer apparatus coupled to at least a plurality of network nodes may have more system information available than embodiments of a transfer apparatus, which are only coupled to a single or few network nodes.

Embodiments of the transfer apparatus may comprise means for determining the second node among a set of possible second nodes based on an (optimal) event detector process distribution criterion. Depending of what is considered to be "optimal", the optimal event detector process distribution criterion may lead to one of to a minimal overall delay of all events in the distributed computing system, a minimal number of secure event subscriptions in the distributed computing system, a minimal variation of the load of a given node of the distributed computing system, or a minimal overall distributed computing system load. Thereby, an event detector process, or an event scheduler associated thereto, may subscribe to events that are required by the event detector process for determining its output event(s). If certain input events are absolutely mandatory for the event detector, it may "securely subscribe" to said input events. In this case, the events in question may be transported to the event detector/scheduler via error controlled transmission concepts (e.g. Automatic Repeat reQuest (ARQ)).

According to some embodiments, the transfer apparatus may comprise means for creating a process instance, which is corresponding to the first event detector process, on the second node in order to obtain the second event detector process. An instance is to be understood as an occurrence or a copy of an object, whether currently executing or not. Instances of a class or a process share the same set of attributes, yet will typically differ in what those attributes contain. The event detector process transfer procedure may, for example, be performed with the aid of an Operating System (OS) controlling the distributed computing system. An OS thereby is to be understood as a set of programs that manages computer hardware resources of the distributed system, and provides common services for application software, like the event detector processes, for example. Such OS services may also comprise instantiating functionalities, i.e. functionalities for creating a process instance, to which the means for copying the process content may have access to. That is to say, the creating means may comprise means for accessing process instantiating functionalities of an operating system controlling the distributed system.

As soon as the second event detector process, which is an instance of the first event detector process, has been instantiated on the second node, it may subscribe to the same event(s) the first second event detector process of the first node has already subscribed to, in order to receive the same event(s) or event stream(s) from the distributed system as input signals. In other words, the means for creating the instance may be operable, after instantiating the second event detector process on the second node, to subscribe the second event detector process for or to identical input events as the first event detector process.

Operating system services may further comprise copying functionalities, to which the copying means for copying the process content may have access to. That is to say, the copying means may comprise means for accessing process copying functionalities of an operating system running on the computing nodes or some other controlling entity of the distributed system. The copying means may also be operable to "freeze" the process content of the first event detector process at a predefined time instant in order to obtain a defined condition of the first event detector process at the freezing time instant. Thereby, "freeze" means that the event detector process is brought into a determined state and ceases to respond to its inputs at the freezing time instant. In other words, the first event detector process may be halted at the freezing time instant in order to copy its content to the instantiated second event detector process.

Hence, the copying means may be adapted to copy the frozen process content from the first event detector process to the second event detector process in order to obtain the same determined state or defined condition at the second event detector process. Thereby, the means for copying may be operable to copy the process content iteratively from the first event detector process to the second event detector process, such that process content, which will not change during a remainder of the copying procedure, is copied first. That is to say, in each iteration only process content is copied, which will not change during the remaining copying procedure. This allows copying the process content without explicitly halting the event detector processes while copying. Hence, the data contained in the first event detector process may be copied from the first node to the second node in a plurality of iterations. Thereby it should be defined which data belongs to the status information of an event detector. In case of processes this is the process memory, for example. While iteratively copying the process content the difference or gap (i.e. the delta) of process content to be copied gets smaller and smaller until difference remain small but not zero. That is to say, a process content delta copy will not be zero because a non-frozen event detector may change its status continuously. Therefore, before copying a last content delta, the event detector process may advantageously be frozen.

Before the newly instantiated, i.e. second, event detector process is started or switched on at the second node, the (identical) input data of both event detector processes may be buffered such that both event detector processes, which, due to the copying, ideally already have the same defined internal condition, also obtain identical external input data starting from the predefined time instant, i.e. the "freeze" instant. Hence, the means for copying may also be operable to buffer the input events of the first event detector process during and/or after copying the process content from the first to the second event detector process.

When everything of the relevant process content has been copied from the first (i.e. the old instance) to the second (i.e. the new instance) event detector process and the input data has been buffered, both event detector processes may be turned on for parallel processing the (ideally identical) buffered input data (events), provided that the first and the second event detector process both are in the same internal conditions or states. That is to say, both event detectors may be switched on after the copy and buffer procedure and may process the branched and, hence, same input data in parallel. For this purpose, the means for coordinating may be operable to schedule the process content copying, the buffering, and processing the input events of the first event detector process, such that both the first and the second event detector processes are running in parallel starting from the predefined (freeze) time instant and based on the copied process content. In this way, the both process instances running on different network nodes may produce identical outputs. Also, the coordinating means may have access to the OS for that purpose, for example.

The means for verifying, which may e.g. comprise a comparator, may then verify whether both event detector processes actually lead to the same output, respectively. If this is the case, the old, i.e. the first, event detector process may be switched off. Thereby the load of the first node may decrease. If both event detector processes do not lead to the same output, the preceding copy and/or the buffer procedure has probably failed and the new (i.e. the second) event detector process may be shut down to start the whole event detector transfer procedure from the beginning. Hence, according to some embodiments, the means for verifying may be operable to shut down the first event detector process in case the output events at both the first and the second event detector processes are identical, or, to shut down the second event detector process in case the output events at both the first and the second event detector processes are not identical.

According to a further aspect of the present invention it is also provided a distributed computing system for determining events based on at least one (raw) sensor data stream. The provided distributed computing system, which may be a computer network, comprises a plurality of distributed nodes, each having an event detector process associated therewith, and at least one embodiment of an apparatus for transferring event detector processes between the distributed nodes of the distributed computing system.

In some embodiments the distributed computing system may be coupled to a locating system for locating and/or tracking objects within a predefined geographical area, wherein the locating system provides the at least one sensor data stream to the distributed computing system, the sensor data stream carrying data being indicative of geographical positions of the located objects. The locating system may be based on a wireless sensor network, which has been already described in the introductory portion of this specification.

Despite transferring event detector processes, events travelling along different paths or routes through the distributed system may still experience different delays, even when the event detectors are (nearly) optimally distributed in the distributed system. This may be due to different propagation delays, signal processing times and/or network jitter. Differences in event delays may lead to undesired false composite event detections, since an event detector may consume input events in a temporal order that does not correspond to their original order of occurrence. Therefore, additionally to optimally distributing event detector among various network nodes, a recovery of an original temporal order of events reaching an event detector via different network paths and, hence, experiencing different processing and/or propagation delays may be desirable for optimum results.

This may be achieved by delaying the events appropriately before forwarding or relaying them to a subsequent event detector. The time at which an event is relayed to the subsequent event detector may be based on the original time stamp of the respective event and the processing and/or propagation delays of all input events required by the subsequent event detector in order to determine its output event.

For this purpose, embodiments of the present invention also provide an apparatus for synchronizing a first event with a second event. The first event has associated therewith a first event timing value based on a common clock signal, while the second event has associated therewith a second event timing value based on the common clock signal. The first and the second event experience different delays, respectively, while travelling through different paths of a distributed computing system. At least one output event is to be determined based on the first and the second event by an event detector. According to embodiments, the apparatus for synchronizing comprises a delay compensator associated to the event detector, wherein the delay compensator comprises an input for receiving the first and the second event and an output for forwarding relayed versions of the received first and second event to the associated event detector. The delay compensator is operable to relay or forward the first and the second event to the associated event detector based on the experienced delays and based on the associated first and second event timing values, which may also be referred to as event time stamps reflecting the original event occurrence time, respectively.

According to yet another aspect of the present invention the apparatus for transferring the first event detector process may be integrated into a distributed computing system, preferably, but not exclusively, in combination with the apparatus for synchronizing first and second events. Such a distributed computing system may, hence, comprise a plurality of distributed nodes, wherein each of the plurality of distributed nodes comprises an apparatus for synchronizing according to embodiments of the present invention, and an apparatus for transferring a first event detector process of a first node of the distributed computing system to a second event detector process of a second node of the distributed computing system, wherein the apparatus for transferring comprises the aforementioned features.

In other words, embodiments provide a distributed computing system for determining events based on at least one (raw) sensor data stream. The distributed computing system, which may be a computer network, comprises a plurality of distributed nodes. The distributed computing system comprises an embodiment of the transfer apparatus according to the present invention. Additionally, each of the plurality of distributed computing nodes may comprise an apparatus for synchronizing a first event, having associated therewith a first event timing value based on a common clock signal, and a second event, having associated therewith a second event timing value based on the common clock signal, wherein the first and the second event experience different delays while travelling through different paths of the distributed computing system. At least one output event is to be determined by an event detector based on the first and the second event. The apparatus for synchronizing comprises a delay compensator associated to the event detector, the delay compensator having an input for receiving the first and the second event and having an output for forwarding relayed versions of the received first and second event to the associated event detector, wherein the delay compensator is operable to relay the first and the second event to the associated event detector based on the experienced delays and based on the associated first and second original event timing values.

The aforementioned undesirable load unbalances among different nodes may, for example, be detected by embodiments of the synchronization apparatus or its delay compensator. If, for example, at least one event delay reaches a prohibitively high delay, this may be an indicator for that fact that a source event detector process, from which the corresponding events reaches the delay compensator, is overloaded or experiences some other problems. In such a scenario it may be desirable to transfer or relocate the malicious source event detector process to some other hardware resource of the distributed computing system. For example, the malicious source event detector process may be transferred from its current source node to another, physically separate and different destination node of the distributed computing system, which has more hardware resources available. The apparatus for transferring events and the apparatus for synchronizing events may, hence, both synergistically cooperate in the described manner. That is to say, the apparatus for synchronizing may detect delay and, hence, load anomalies within the distributed computing system, while the apparatus for transferring may transfer event detector processes in order to better balance the distribution of event detectors, leading to smaller overall delays and lower loads.

Yet further aspects of the present invention also provide a method for transferring a first event detector process of a first node of a distributed computing system to a second event detector process of a second node of the distributed computing system, the second node being different from the first node. The method comprises a step of copying a process content of the first event detector process to the second event detector process, a step of coordinating input events of the first event detector process such that the input events of the first event detector process are processed in parallel at both the first and the second event detector processes, and a step of verifying whether the input events of the first event detector process, which are processed in parallel at both the first and the second event detector process, lead to identical output events at both the first and the second event detector processes.

Some embodiments comprise a digital control circuit installed within an apparatus for performing the method for transferring the first event and the second event. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

One benefit of embodiments of the present invention is that events may be recognized/detected and forwarded to subsequent event detectors with only a minimum delay. Embodiments of the present invention may be implemented such that forwarding events with less delay is not easily possible without risking wrong subsequent event detection. Also, with embodiments of the present invention developers of event detectors do not need to have any special knowledge on particular event delays, as embodiments of the distributed system may measure and administer those event delays automatically.

Another benefit may be seen in the self-organization of a distributed computing system according to embodiments of the present invention. Such a distributed computing system may react on changing system conditions by transferring event detector processes between network nodes, such that the distributed system or network is always capable of performing robust and efficient event signal processing.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Figure 1:
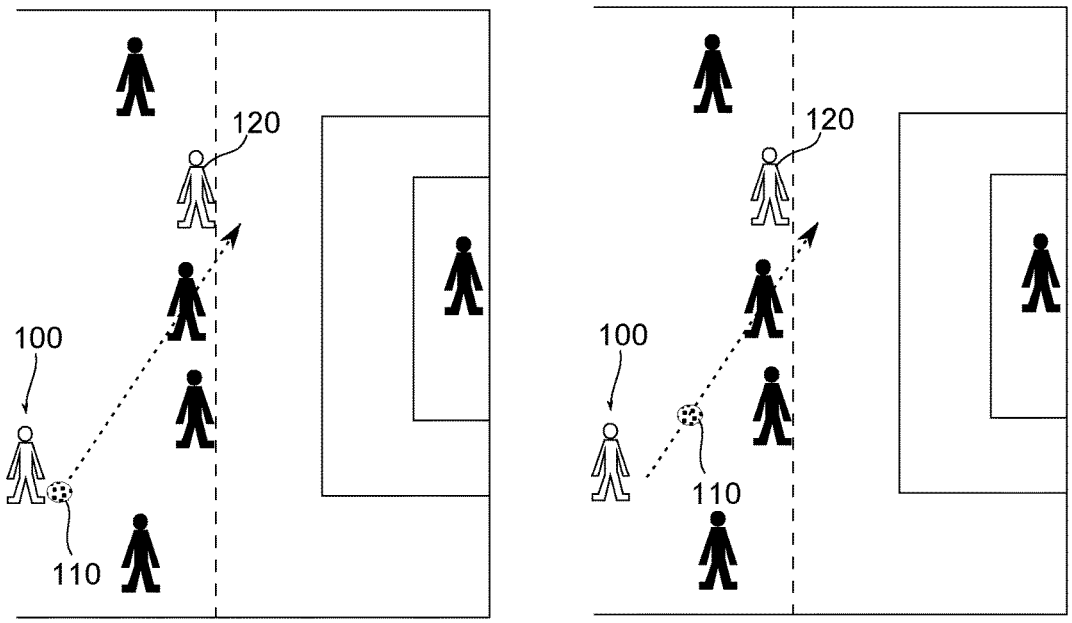
FIG. 1 illustrates a soccer-specific offside-event detection scenario.
Figure 2:
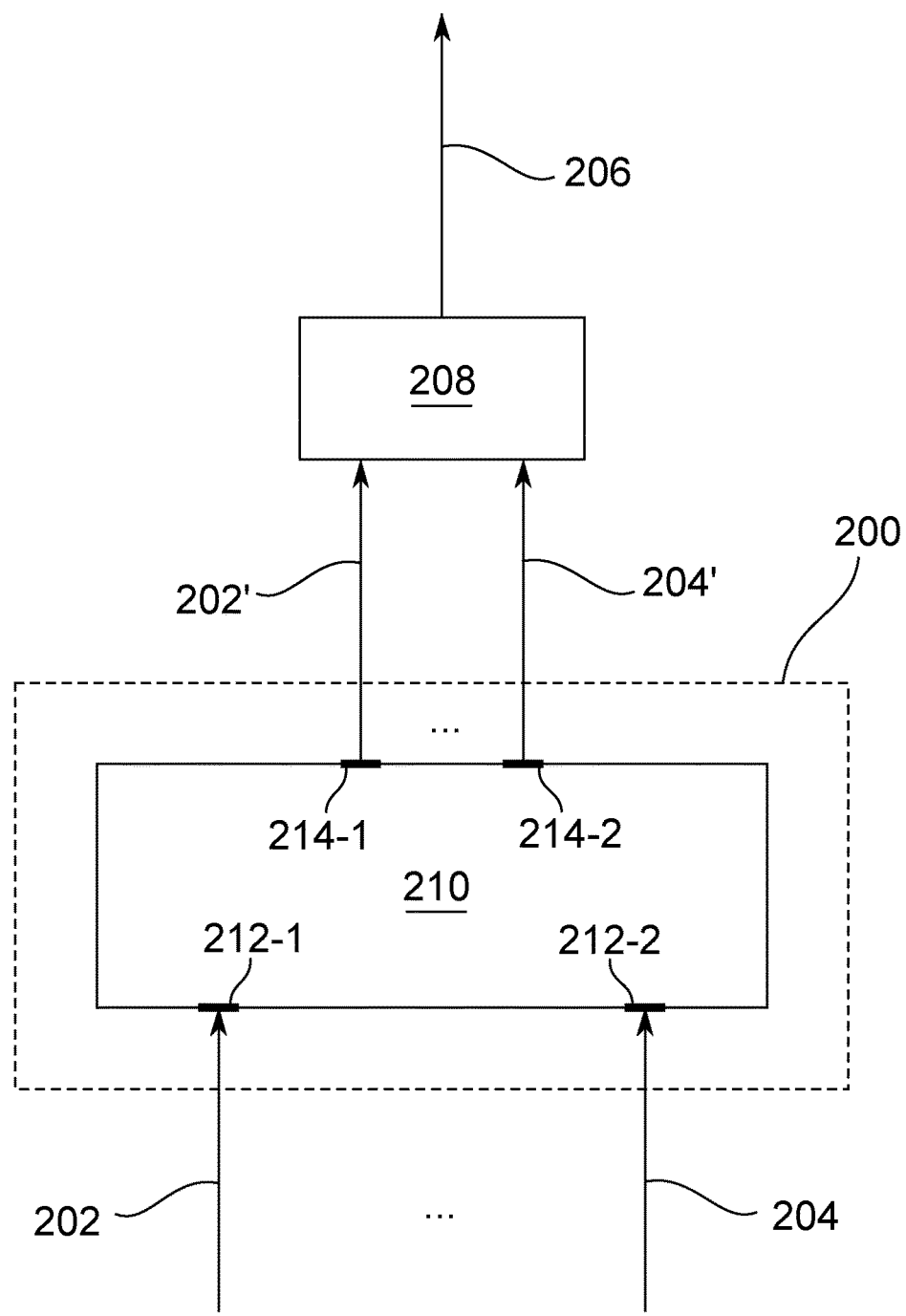
FIG. 2 schematically shows a block diagram of apparatus for synchronizing a first event with a second event, according to an embodiment of the present invention.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein. FIG. 2 schematically illustrates an embodiment of an apparatus 200 for synchronizing a first event 202 with a second event 204.

The first event 202 has associated therewith a first original event timing value or timestamp based on a common clock reference signal. The second event 204 also has associated therewith a second original event timing value or timestamp based on the common clock signal. The first and second original event timing values represent an original event occurrence time instant. The common clock signal yields an overall system time, which is valid for all the distinct nodes in a distributed computing system. Before reaching the apparatus 200 for synchronizing the events, the first and the second event 202, 204 each experience different delays while traveling through different paths or routes of the distributed computing system (not shown in FIG. 2). Based on the two events 202, 204 at least one output event 206 may be determined by an event detector 208, which may be arranged subsequent (succeeding) or downstream to the apparatus 200 for synchronizing the events 202, 204.

The synchronization apparatus 200, which may also be regarded as an event scheduler for the event detector 208 in some embodiments, comprises a delay compensator 210, also referred to as delay compensating means, which is associated or related to the subsequent event detector 208. The delay compensator 210 has inputs 212-1, 212-2 for receiving the first and the second event 202, 204 from the distributed network. Further, the delay compensator has outputs 214-1, 214-2 for relaying or forwarding relayed versions of the received first and second event 202, 204 to the associated event detector 208, which may be arranged subsequent or downstream to the delay compensator 210. The delay compensator 210 is operable to relay the first and the second event 202, 204 to the associated event detector 208 based on the experienced delays of the events 202, 204 and based on the associated first and second original event timing values or time stamps linked to the two events 202, 204.

Figures 3, 4:
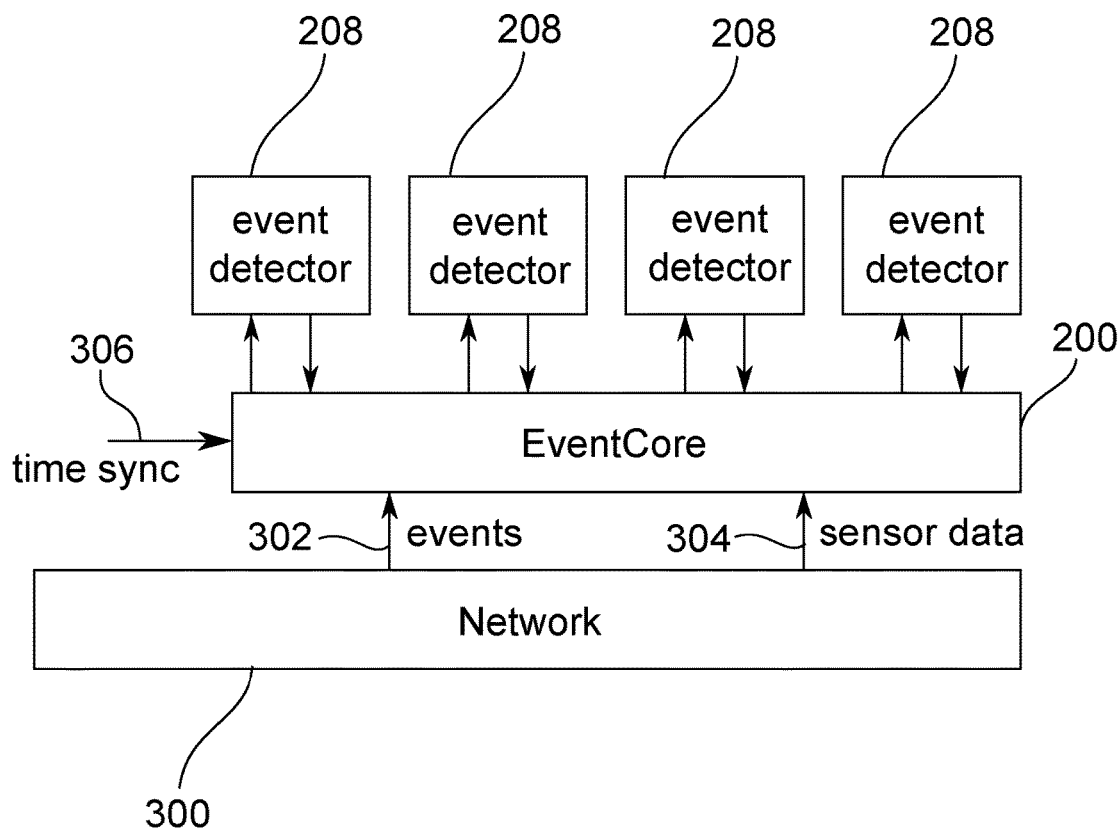
FIG. 3 schematically shows an embodiment of the present invention, wherein the apparatus for synchronizing the first event with the second event is implemented as middleware between a distributed network and an associated event detector software.
FIG. 4 shows a timing table of four events A, B, C, and D, which are required by an event detector.

An exemplary setup of a distributed computing system 300 (in form of a network), various event detectors 208, and an embodiment of an apparatus 200 for synchronizing a plurality of events is schematically depicted in FIG. 3.

FIG. 3 schematically illustrates a distributed network 300 from which events 302 and raw sensor data 304 reach the synchronization apparatus 200, which is exemplarily denoted as "EventCore" in FIG. 3. The synchronization apparatus 200 may act as an event scheduler by receiving events 302 and/or raw sensor data 304 from the underlying network 300 on the one hand, and by forwarding them to a plurality of event detectors 208 coupled to the synchronization apparatus 200 at certain required output or relay time instances, on the other hand. The synchronization apparatus 200 is adapted to synchronize different events 302 and/or sensor data 304, which are required by the subsequent event detectors 208. Thereby, the synchronization apparatus 200 may be implemented in a distributed manner, such that it can individually synchronize events 302 or 304 required by each of the subsequent event detectors 208. That is to say, the event core apparatus 200 may comprise a plurality of delay compensator's 210 or instances thereof, wherein each of the plurality of delay compensator's 210 is associated to one of the plurality of subsequent event detectors 208. Thereby, a delay compensator instance 210 and an associated event detector 208 may preferably be implemented on one common network node. According to some embodiments, the synchronization apparatus 200 and its delay compensator instances 210 may be implemented as middleware between the network 300 and the event detectors 208.

A common clock signal 306 is provided to the synchronization apparatus 200 or to the different instances thereof, thereby enabling the temporal synchronization of all delay compensator and/or event detector instances 210, 208 of the distributed system architecture depicted in FIG. 3. Hence, every delay compensator 210 has access to the same common time base. In other words, all (distributed) synchronization apparatus or delay compensator instances 200, 210 may retrieve the same system time stamp at any given time. In case a delay compensator instance 210 receives an event 302 or 304, it may buffer said event for an associated subsequent event detector instance 208 for a required amount of time, which corresponds to a sufficiently high probability for that no other events required by the event detector instance 208 and carrying an earlier timestamp will be received.

For more details let us look at the following example: an arbitrary event detector 208 requires input events A, B, C, and D in order to be able to correctly determine or detect a composite output event E based on said input events. Since every network instance is synchronized by the global common clock signal 306, it is possible to associate a detection time to every event (see FIG. 4, middle column). Thereby, an event's detection time instant is necessarily later than the event's actual occurrence time instant (see FIG. 4, left column) due to limited processing speed.

In this example, event A's occurrence time $t_{event,A}$ is 10, however, it is only detected by an event detector at detection time $t_{detection,A}$=14. The subsequent event detector for detecting the composite event E receives the required event A at reception time $t_{ED,A}$=16. Similarly, event B actually happens at $t_{event,B}$=12 and gets detected by some event detector at $t_{detection,B}$=13. The subsequent composite event detector for detecting the composite event E retrieves event B at time instance $t_{ED,A}$=15. That is to say, composite event detector for event E receives event B before it receives event A, which has, however, actually happened earlier than event B. Due to processing and network propagation delays also event C, which actually appears later than event A, is received earlier that the subsequent composite event detector.

From this example, without using embodiments of the present invention, it may be seen that the subsequent composite event detector for event E receives the required events A, B, C, and D in a temporal order (see FIG. 4, rightmost column), which is different from the original causal or temporal order (see FIG. 4, leftmost column) of said events. Hence, it is the task of embodiments of the present invention to sort the required events A, B, C, and D appropriately in order to recover a temporal order which corresponds to the original temporal order before forwarding the required events A, B, C, and D to the subsequent composite event detector. For that purpose an instance of the synchronization apparatus 200 may be implemented on each network node together with an associated event detector 208.

According to embodiments, a delay compensator 210 of the (possibly distributed) synchronization apparatus 200 may be operable to relay the plurality of required events to an associated event detector such that a temporal order of the relayed versions of the required events A, B, C, and D, which have been received at the delay compensator 210, corresponds to an original temporal order of the plurality of required events A, B, C, and D. For that purpose the delay compensator 210 may relay each of the plurality of events A, B, C, and D such that a relative time difference between individual relayed events corresponds to an original relative time difference between the individual events A, B, C, and D, respectively. For recovering the original temporal event order, the delay compensator 210 may determine output time instances for each of the plurality of events A, B, C, and D. Thereby an event is relayed to the associated event detector 210 at its corresponding output time instance. The events' output time instances may be determined based on a common delay value and the original occurrence time instances of the events A, B, C, and D.

Taking the above example, the synchronization apparatus instances 200 and, hence, the delay compensator instances 210 comprised therein, may measure or determine the following event delays based on their respective reception times and their respective associated original event timing values reflecting their actual occurrence:

Event A: 16-10=6
Event B: 15-12=3
Event C: 15-14=1
Event D: 18-15=3

Obviously, the reception of event A at the delay compensator 210 takes substantially longer compared to the other events B, C, and D required by the subsequent composite event detector. This may, for example, be due to the detection of event A on a far remote computing node leading to a long propagation time through the network 300, or due to event A being detected by a computational more complex algorithm with longer computation time. In the exemplary case the long delay of event A is probably due to the event detection taking four clock cycles or time intervals.

Let us assume we have measured or determined all delays of all events of interest sufficiently often and we are at the following position: at time instance $t_{DC,C}$=1000 event C reaches the apparatus 200 for synchronizing comprising the delay compensator 210. Event C carries along an event timing value $t_{event,C}$=999, which indicates that event C has occurred at time instant 999. The delay compensator 210 looks at the delays of all the events of interest, i.e., all the events A, B, C, and D required by the associated subsequent composite event detector 208, and determines how long the event C has to be delayed until it may be forwarded to the associated subsequent event detector 208. Note that the delay compensator 210 only knows that the events A, B, C and D are required by the associated subsequent event detector 208, but not in which order and for which purpose.

The output time instances for relaying event C to the associated subsequent event detector 208 may be determined according to $$t_{out,C} = t_{even,C} + \max(\Delta(A), \Delta(B), \Delta(C), \Delta(D)) \quad (1)$$

$$= 999 + \max(6, 3, 1, 3)$$

$$= 999 + 6$$

$$= 1005.$$

In Eq. (1) A, B, C, and D denote the first to fourth event, respectively, $\Delta(.)$ denotes a delay of an event from its occurrence to the input of the delay compensator 210 associated to the associated subsequent event detector 208, max(.) denotes the maximum operator, and $t_{out,C}$ denotes the output time instance of the relayed event C.

In general, the delay compensator 210 may be operable to determine an output time instance for relaying event $e_j$ from a set of K required events based on $$t_{out,ej} = t_{event,ej} + \max(\Delta(e_1), \Delta(e_2), \ldots, \Delta(e_j), \ldots, \Delta(e_K)). \quad (2)$$

In a dynamic distributed computing system with a changing load situation of network 300, possibly changing processing capabilities of individual nodes, and/or possibly dynamically changing network paths, the propagation or processing delays of the events reaching a delay compensator instance 210 are likely to change over time instead of being static. The delay compensator 210 may account for this by determining an event delay value $\Delta(e_j)$ of an event $e_j$ from a set of K events based on a current and a plurality of previously measured or determined event delays for said event $e_j$. Thereby, more recent event delays may be weighted more than their preceding event delays. In a specific embodiment the delay compensator may be adapted to determine the event delay $\Delta(e_j)$ of event $e_j$ based on $$\Delta(e_j) = \frac{1}{2} \sum_{i=1}^{k} \left( \Delta e_j(i) \frac{1}{2^{i-1}} \right) + \theta \cdot \sigma(e_j), \quad (3)$$

wherein k denotes a set of k already determined event delays, $\Delta e_j(i)$ denotes the i-th determined delay of event $e_j$, wherein i=1 corresponds to the latest determined delay, $\sigma(e_j)$ denotes the standard deviation of the latest determined delays $\Delta(e_j)$, and wherein $\theta$ denotes a security factor. In some embodiments the factor $\theta$ may also be set to zero for an easier and less complex computation of the event delay $\Delta(e_j)$ of the event j. The individual summands of Eq. (3) are weighted according to a geometrical row. The factor ½ serves as a normalization factor, since the geometrical row converges towards 2 for sufficiently large "k". The term $\theta \cdot \sigma(e_j)$ may serve as a security buffer, taking into account the standard deviation of the latest measurement values. With e.g. $\theta=3$, it may serve for 99.975% security, for example. Thereby, 99.975% security means that a delay computed or predicted according to Eq. (3) is not smaller than a corresponding actual or real network delay with a probability of 99.975%. The security buffer $\theta \cdot \sigma(e_j)$ may be adapted a stability of the network with respect to delay variations, for example.

Turning back to the above simple example, the event C may be forwarded to the associated subsequent event detector 208 at the output time instance $t_{out,C}=1005$. This is exactly the time instance at which we may say that the events A, B, and D did not happen causally before event C. In our example the associated subsequent event detector 208 gets forwarded the following events at the relay or output time instances indicated in the following table:

| Event | Occurrence | received at delay compensator | relayed to event detector |
|---|---|---|---|
| A | 999 | 1005 | 999 + 6 = 1005 |
| B | 999 | 1002 | 999 + 6 = 1005 |
| C | 999 | 1000 | 999 + 6 = 1005 |
| D | 1000 | 1003 | 1000 + 6 = 1006 |

As one can see from the above table, the events A, B, C, and D have been forwarded by the delay compensator 210 to the associated subsequent event detector 208 correctly ordered according to their original temporal order of occurrence.

Figure 5:
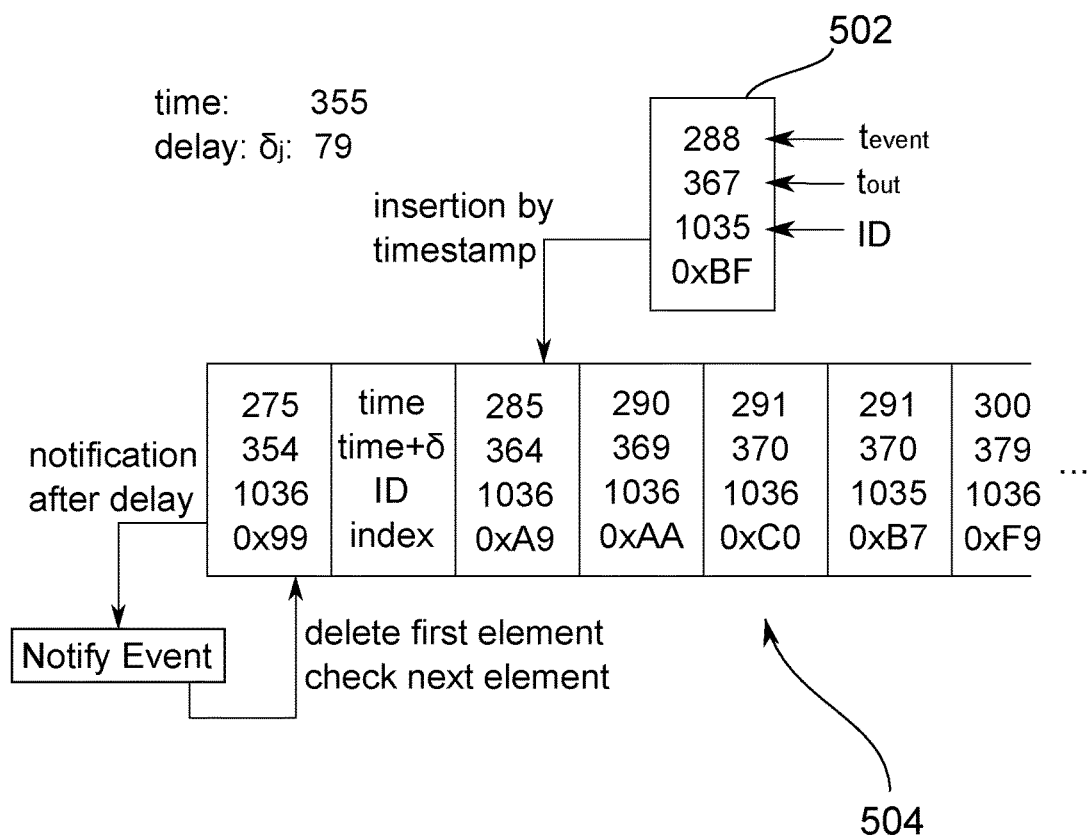
FIG. 5 schematically illustrates an event scheduling according to an embodiment of the present invention.

The working principle of a synchronization apparatus 200 comprising a delay compensator 210 is schematically depicted by FIG. 5.

An incoming event, denoted by reference numeral 502, comprises an original event timing value $t_{event}$ and an event IDentifier (event ID). Further, an output time value $t_{out}$ is associated with the event 502. The event's output or relay time $t_{out}$ may be determined based on the original event time $t_{event}$ and a common delay value $\delta$, which is 79 in the example depicted in FIG. 5. Possible computations of the common delay value have been described above. The event 502 to be relayed to a subsequent or downstream event detector 208 may then be inserted into a relaying or scheduling buffer 504 of the synchronization apparatus 200. The insertion of incoming events into the buffer 504 may be based on their determined output time instances $t_{out}$, at which the events are to be forwarded to the associated subsequent event detector 208. For the exemplary event 502, which has just arrived at the input of the delay compensator 210, the output time instance $t_{out}$ has been computed to 367. For that reason it is inserted in between two buffered events which are to be scheduled (i.e. forwarded) at output times 364 and 369, respectively. After the events have been delayed according to the current common delay value $\delta$, which is 79 in the depicted example, the events in the event buffer 504 are scheduled or notified, i.e. forwarded, to the subsequent associated event detector 208. After an event has been forwarded to the associated event detector 208 the event may be deleted before the next event in the buffer 504 is scheduled.

Figure 6:
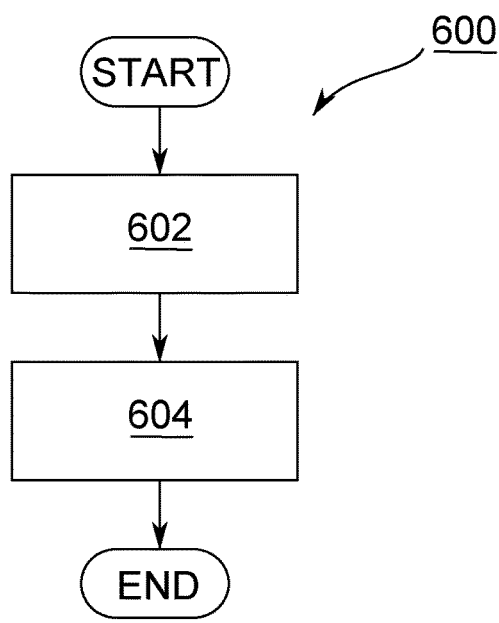
FIG. 6 schematically shows a flow chart of an exemplary method for synchronizing a first event with a second event.

FIG. 6 schematically illustrates a flowchart of a method 600 for synchronizing the first event 202 and the second event 204, according to an embodiment of the present invention.

As mentioned before, the two events 202, 204 have associated therewith first and second event time stamps $t_{event,e1}$, $t_{event,e2}$ based on the common clock signal 306, respectively. Furthermore, the first and the second event both experience different delays $\Delta(e1)$, $\Delta(e2)$ while traveling through different routes of the distributed computing system 300. For synchronizing the events 202, 204 the synchronization method 600 comprises a step 602 of relaying, at a delay compensator 210, the first and the second event 202, 204 to the associated event detector 208, wherein the first and the second event 202, 204 are relayed to the event detector 208 based on the experienced delays $\Delta(e1)$, $\Delta(e2)$ and based on the associated first and second original event time stamps $t_{event,e1}$, $t_{event,e2}$. Further, the method 600 comprises a step 604 of detecting, at the event detector 208 associated to the delay compensator 210, at least one output event 206 based on the relayed first and the relayed second input events 202', 204'. The relayed first and the relayed second input events 202', 204' may also be denoted as relayed versions of the first and the relayed second input events. Typically, these relayed versions are identical to the first and the second events 202, 204, respectively. However, they may be temporally delayed by the synchronization apparatus 200 or the delay compensator 210 thereof.

The described concept only works reliably if determined or measured event delays are available. Right after system startup the event delays are unknown. However, it is possible to provide initial event delays to the delay compensator 210 after a system startup. Such initial event delays may be based on worst-case experiences for the respective events. Alternatively, the synchronization apparatus may store its knowledge on event delays prior to its shut down, such that every synchronization apparatus instance 200 may retrieve the configuration of a previous (network) state and, hence, may approximate the delays for the current network configuration since it has information on which events are executed on which nodes of the distributed computing system.

Measured delay values may have been measured in different network and/or CPU-load situations. This could be accounted for by appropriate normalization of the respective measured delay values. For example, the normalization factor reflecting a current load situation could be applied to the delay value measured under said current load situation. For example, a normalization factor corresponding to a normal load situation could be one. If a delay value is determined in a high load situation this may be reflected by a normalization factor larger than 1. In contrast, if a delay value is measured under low load conditions this may be reflected by normalization factor smaller than 1. The actual weight applied to the respective delay value, for example in Eq. (3), could then be dependent on a relation between the normalization factor of the measured delay and a current normalization factor related to the current load situation. If a current load situation is smaller than a load situation, where a certain delay value has been determined, such an approach might lead to a normalized delay value which is smaller than the actually measured delay value in order to account for the smaller or lower load situation.

Figure 7:
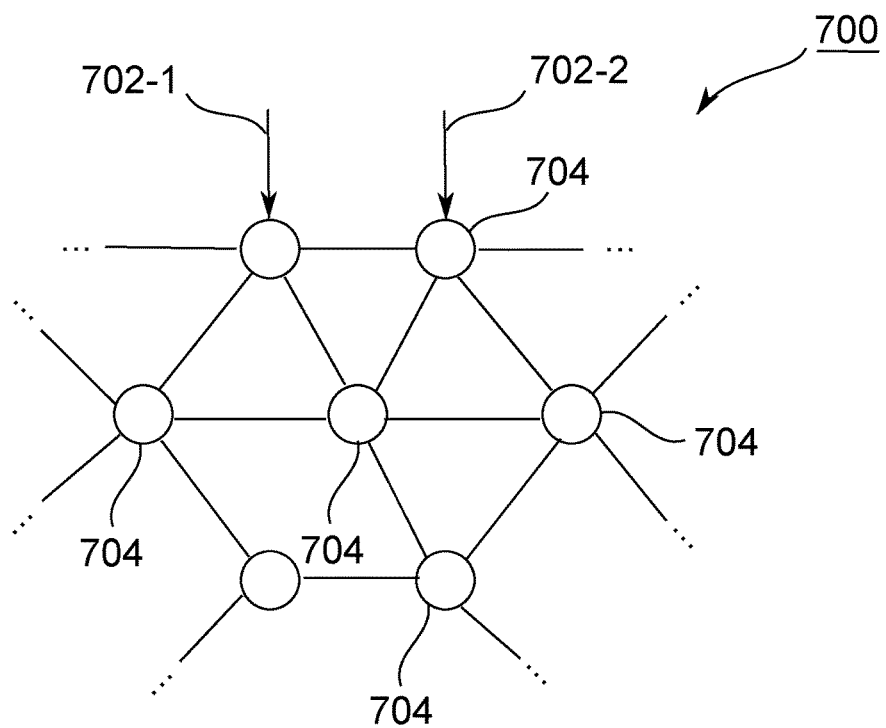
FIG. 7 shows an embodiment of a distributed computing system for determining events based on at least one sensor data stream, wherein the distributed computing system comprises a plurality of distributed computing nodes, wherein each of the plurality of distributed computing nodes comprises an embodiment of apparatus for synchronizing events.

FIG. 7 schematically illustrates a further embodiment of the present invention.

FIG. 7 schematically shows a distributed computing system 700 for determining events based on at least one sensor or data stream 702-1, 702-2. The distributed computing system 700, which may a distributed computer network or a multicore processor for example, comprises a plurality of distributed computing nodes 704, wherein each of the plurality of distributed computing nodes 704 comprises an apparatus 200 for synchronizing according to embodiments of the present invention.

According to an embodiment of the present invention each of the computing nodes 704 may hence comprise a synchronization apparatus 200 together with a delay compensator 210. Also, each of the nodes 700 comprising a synchronization apparatus 200 also comprises an associated event detector 208. According to one exemplary embodiment the computing nodes 704 may be distributed signal processors or computers. In some other embodiments the notes 704 may also be different course of a multicore processing unit being implemented in the same computer device and, hence, being located essentially at the same geographic position.

Embodiments of the present invention are in particular related to the detection of events based on raw sensor data stemming from a wireless tracking system, which may be used for tracking players and all positions of a ball sports event, such as, for example, soccer, American football, rugby, tennis, etc. Hence, the distributed computing system 700 may be coupled to such a wireless tracking system or locating system for locating and/or tracking objects and all persons with in a predefined geographical area, which may be a soccer field for example. The locating system inputs the at least one sensor data stream 702-1, 702-2 to the distributed computing system 700, wherein the sensor data stream carries data being indicative of geographical positions of the located objects. Furthermore, the sensor data stream may also carry other kinematic data of the located objects.

For detecting events, such as primitive and/or composite events, various event detectors 208 are running on different nodes 704 of the distributed computing system 700. Such event detectors or event detector instances 208 may cause different load on their respective nodes 704 and/or the whole distributed computing system 700, depending on a current condition of the system 700 or depending on the complexity of the event detectors 208 and/or the sensor data streams 702-1, 702-2 to be analyzed. Hence, in a scenario of changing premises or conditions of an original system configuration, i.e. a distribution of the event detectors 208 onto the various network nodes 704, a current system configuration could turn out to be suboptimal or could even lead to a crash of the distributed computing system 700.

Such undesirable load unbalances, which consequently also lead to unbalanced event delays, may be detected by embodiments of the synchronization apparatus 200 or, in particular, its delay compensator or delay compensator instance 210. If at least one measured or determined event delay $\Delta(.)$ reaches a prohibitively high value this may indicate that an event detector process delivering the corresponding event and being arranged upstream to the delay compensator 210 may be overloaded or may experience some other problems. In such a scenario it may be desirable to transfer or relocate the malicious originating event detector process to some other hardware resource or node 704 of the distributed computing system 700. For example, the malicious event detector process may be transferred from its current node to another, physically separate and different node of the distributed computing system 700. For this purpose, according to a further aspect of the present invention, it is also provided an apparatus 800 for transferring an event detector process between different nodes 704. Embodiments of the apparatus 800 for transferring may be combined with embodiments of the synchronization apparatus 200 and/or the distributed computing system 700.

Figure 8:
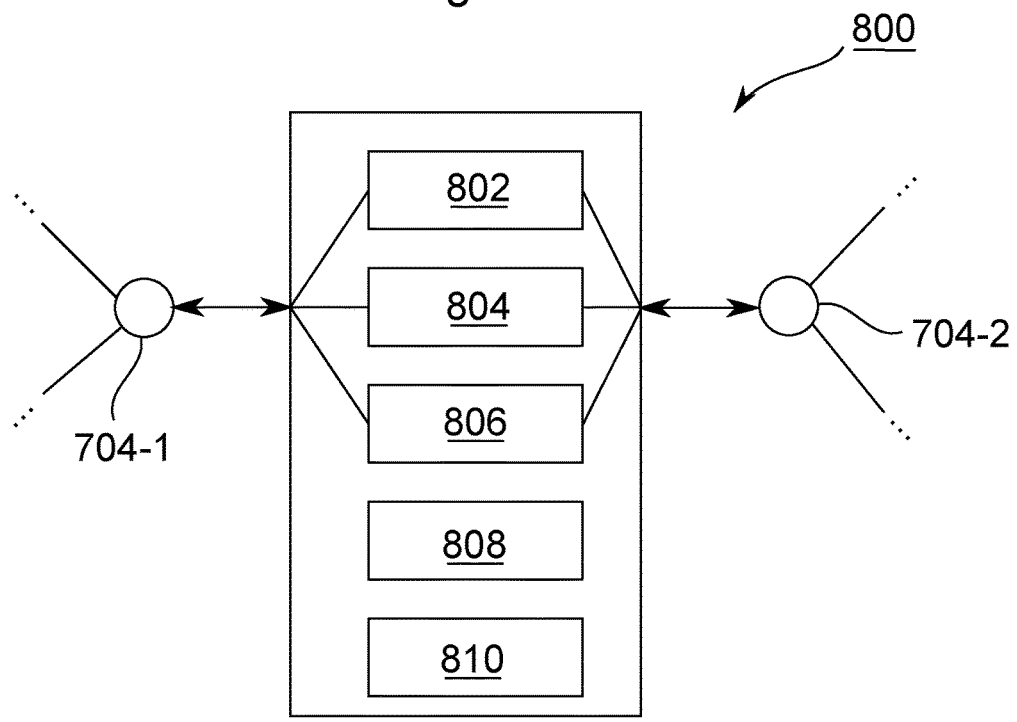
FIG. 8 schematically illustrates an embodiment of an apparatus for transferring a first event detector process of a first node of a distributed computing system to a second event detector process of a second node of the distributed computing system.

FIG. 8 schematically illustrates a schematic block diagram of an embodiment of an apparatus 800 for transferring, which may also be referred to as transferring apparatus.

The transferring apparatus 800 serves for transferring a first event detector process of a first node 704-1 of the distributed computing system 700 to a second event detector process of a second node 704-2 of the distributed computing system 700. Thereby the second node 704-2 is different from the first node 704-1, either with respect to its geographic location or with respect to a different processing unit of a multicore processor, for example. The transferring apparatus 800 comprises means 802 for copying a process content of the first event detector process to the second event detector process. Further, the transferring apparatus 800 comprises means 804 for coordinating input events of the first event detector process such that the input events of the first event detector process are processed in parallel at both the first and the second event detector processes. Moreover, the apparatus 800 comprises means 806 for verifying whether the input events of the first event detector process, which are processed in parallel at both the first and the second event detector process, lead to identical output events at both the first and the second event detector processes.

A process generally is to be understood as an instance of a computer program that is being executed on a computer device, which may be comprised by a network node. A process comprises the computer program's program code and its current activity. An event detector process may comprise a state machine, which may be understood as a behavioral model used to design computer programs. A state machine is composed of a (finite) number of states associated to transitions. A transition is a set of actions that starts from one state and ends in another (or the same) state. A transition is started by a trigger, wherein such a trigger may, for example, be a primitive or composite event input to the process. Hence, according to aspects of the present invention, an event detector process may comprise a state machine and an event detector process' content or memory may reflect a current state of said state machine, as, for example, individual variables or arrays or variables.

In embodiments where there is a set of possible or alternative second computing nodes 704-2 for taking over the first event detector process of the first node 704-1, the transfer apparatus 800 may further comprise means 808 for determining the second node 704-2 among the set of possible nodes based on or according to an optimal event detector process distribution criterion. Thereby, such an optimal event detector process distribution criterion may lead to one of a minimal overall delay of all events in the distributed computing system 700, a minimal number of secure event subscriptions in the distributed computing system 700, a minimal variation of the load of a given node 704 of the distributed computing system 700, or a minimal overall distributed computing system load.

The means for means 808 for determining may, for example, comprise a central network entity that has information of an overall network condition, including the load of individual nodes 704 and the load of the whole system 700. Such a central network entity may also have information on event delay times $\Delta(.)$ of the events travelling through the distributed network 700. In such a case the central network entity may initiate a transfer of an event detector process e.g. from a more heavily loaded node 704-1 to a less heavily loaded node 704-2. Or, it may initiate an event detector process transfer between different nodes 704-2, 704-2 in order to reduce one or more event delays in the distributed system 700.

According to another embodiment, the means 808 for determining may also comprise or be comprised by a synchronization apparatus 200 or a delay compensator instance 210 thereof. A delay compensator instance 210 has knowledge of delays of those events it relays to an associated subsequent or downstream event detector process. For example, in case the delay compensator instance 210 measures a prohibitively high delay of an event stemming from an originating or upstream event detector, the delay compensator instance 210 may initiate the transfer of said upstream event detector process from its current network node to another network node in order to reduce the event delay. In case the delay compensator instance 210 has no further knowledge on the load situation of individual nodes 704 in the distributed system 700, this may be a simple trial and error procedure, for example.

According to some embodiments, the transfer apparatus 800 may further comprise means 810 for creating a process instance, which is corresponding to the first event detector process, on the second node 704-2 in order to obtain the second event detector process.

The whole process transfer procedure may, for example, be performed with the aid of an Operating System (OS), which is to be understood as a set of programs that manages computer hardware resources, and provides common services for application software, like an event detector process, for example. Such OS services may also comprise instantiating functionalities to which the means 802 for copying the process content may have access to. That is to say, the creating means 810 may comprise means for accessing process instantiating functionalities of an operating system running on the individual computing nodes 704-1, 704-2 and/or controlling the distributed system 700. As soon as the second event detector process of the second node 704-2 has been instantiated it may subscribe to the same event(s) the first second event detector process of the first node 704-1 has subscribed to, in order to receive the same event(s) or event stream(s) from the distributed system as input signals. In other words, the means 810 for creating the instance may be operable, after instantiating the second event detector process on the second node 704-2, to subscribe the second event detector process for identical input events as the first event detector process.

OS services may further comprise copying functionalities, to which the copying means 802 for copying the process content may have access to. That is to say, the copying means 802 may comprise means for accessing process copying functionalities of an operating system running on the computing nodes 704-1, 704-2 or some other controlling entity of the distributed system 700. The copying means 802 may also be operable to "freeze" the process content of the first event detector process at a predefined time instant in order to obtain a defined condition of the first event detector process. Here, "freeze" means the event detector process ceases to respond to its inputs. The copying means 802 may further be adapted to copy the frozen process content from the first event detector process to the second event detector process in order to obtain the same defined condition at the second event detector process. Thereby, the means 802 for copying may be operable to copy the process content iteratively from the first event detector process to the second event detector process, such that content, which will not change during a remainder of the copying procedure, is copied first. Hence, the data contained in the first event detector process may be copied from the first node 704-1 to the second node 704-2 in a plurality of iterations. Thereby it should be defined which data belongs to the status information of an event detector. In case of processes this is the process memory, for example. While iteratively copying the process content the difference or gap (i.e. the delta) of process content to be copied gets smaller and smaller until difference remain small but not zero.

Before the new, i.e. second, event detector process is started or switched on at the second node 704-2, the (identical) input data of both event detector processes may be buffered such that both event detector processes, which ideally already have the same defined internal condition, also obtain identical external input data starting from the predefined time instant, i.e. the "freeze" instant. Hence, the means 802 for copying may also be operable to buffer the input events of the first event detector process during and/after copying the process content from the first to the second event detector process.

When everything of the relevant content has been copied from the first (old) to the second (new) event detector process and the input data has been buffered, both event detector processes may be turned on for parallel processing the (ideally identical) buffered input data (events), given the same internal conditions or states of the first and the second event detector process. That is to say, both event detectors are switched on after the copy and buffer procedure and process the branched and, hence, same input data in parallel. For this purpose, the means 804 for coordinating may be operable to process the input events of the first event detector process in parallel at both the first and the second event detector processes starting from the predefined (freeze) time instant and based on the copied process content. Also, the coordinating means 804 may have access to the OS for that purpose, for example.

The means 806 for verifying, e.g. a comparator, then verifies whether both event detector processes lead to the same output, respectively. If this is the case, the old, i.e. the first, event detector process may be switched off. If this is not the case the copy and/or the buffer procedure has probably failed and the new (i.e. the second) event detector process may be shut down to start the whole transfer procedure from the beginning. Hence, according to some embodiments, the means 806 for verifying may be operable to shut down the first event detector process in case the output events at both the first and the second event detector processes are identical, or, to shut down the second event detector process in case the output events at both the first and the second event detector processes are not identical.

As has been mentioned above, embodiments of the transferring apparatus 800 may be combined with embodiments of the synchronization apparatus 200, as their features may synergistically complement each other. Hence, some aspects of the present invention also provide a distributed computing system 700 for determining events based on at least one sensor data stream, wherein the distributed computing system comprises a plurality of distributed computing nodes 704 and an embodiment of an event process transfer apparatus 800 for transferring a first event detector process of a first node 704-1 of the distributed computing system 700 to a second event detector process of a second node 704-2 of the distributed computing system 700. Further, each of the plurality of distributed computing nodes 704 comprises an apparatus 200 for synchronizing a first event 202, having associated therewith a first event time $t_{event,e1}$ based on a common clock signal, and a second event 204, having associated therewith a second event time $t_{event,e2}$ based on the common clock signal, wherein the first and the second event 202, 204 (or e1 and e2) experience different delays $\Delta(e1)$, $\Delta(e2)$ while travelling through different paths or routes of the distributed computing system 700, and wherein at least one output event 206 is to be determined by an event detector (process) 208 based on the first and the second event 202, 204 (or e1 and e2). As has been already explained with reference to FIG. 2, the apparatus 200 for synchronizing the events 202, 204 comprises a delay compensator 210 associated to the event detector 208, the delay compensator 210 having inputs 212-1, 212-2 for receiving the first and the second event 202, 204 and having an output 214-1, 214-2 for forwarding relayed versions 202', 204' of the received first and second event to the associated event detector 208. Embodiments of the delay compensator 210 are operable to relay the first and the second event 202, 204 to the associated event detector 208 based on the experienced delays $\Delta(e1)$, $\Delta(e2)$ and based on the associated first and second event times $t_{event,e1}$, $t_{event,e2}$, as has been explained in greater detail above.

Figure 9:
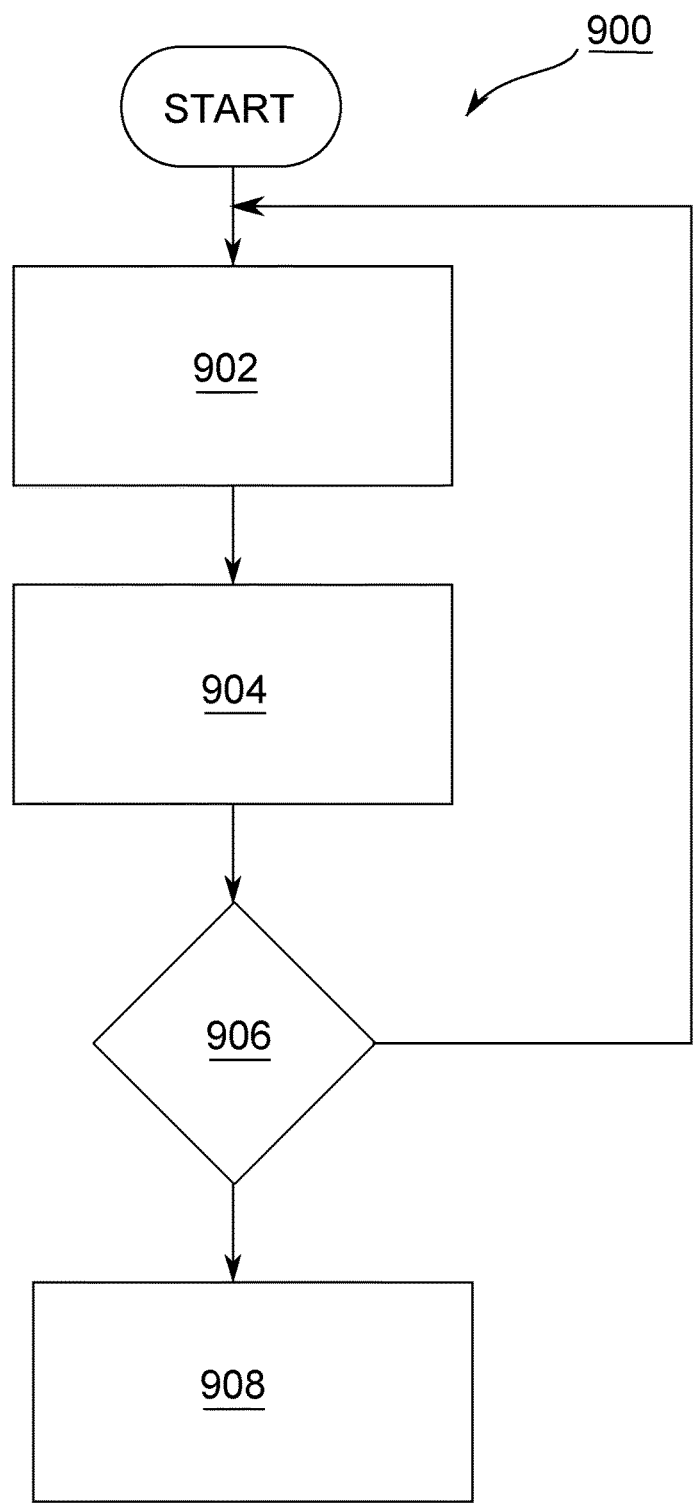
FIG. 9 schematically illustrates a flow chart of an embodiment of method for transferring a first event detector process of a first node of a distributed computing system to a second event detector process of a second node of the distributed computing system.

Aspects of the present invention, where event detectors shall be transferable from one node to another node, preferably while they are being executed or running, also comprise a method for transferring a first event detector process of a first node 704-1 of a distributed computing system 700 to a second event detector process of a second node 704-2 of the distributed computing system 700. A schematic flow chart of such a transfer method 900 is illustrated in FIG. 9.

The transfer method 900 comprises a step 902 of copying a process content of the first event detector process to the second event detector process. Before that it may be determined which computing node or administrative process thereof will handle the process of an overloaded event detector process/thread. In some embodiments the copying step 902 may comprise copying data comprised of the event detector process from the first node 704-1 to the second node 704-2 in a plurality of iterations, as it has been described above. The copying step 902 thereby comprises defining which data belong to the status information of an event detector. In case of processes this is the process memory, for example. While copying the delta of process content to be copied gets smaller and smaller until changes remain small but not zero.

The method 900 further comprises a step 904 of processing input events of the first event detector process in parallel at both the first and the second event detector processes. For that purpose, the first event detector's input data may be buffered and/or copied for both event detectors, such that both detectors may process identical input data streams. Both event detectors may then be switched on in order to process said input data streams in parallel.

In a further step 906 it is verified whether the input events of the first event detector process, which are processed in parallel at both the first and the second event detector process, lead to identical output events at both the first and the second event detector processes. If this is the case, i.e., in case the output events at both the first and the second event detector processes are identical, the first event detector process may be shut down (see step 908). If this is not the case, i.e., in case the output events at both the first and the second event detector processes are not identical, the second event detector process may be shut down instead and the transfer method 900 is started again at step 902.

Hence, the transfer of event detector processes between different network nodes may, for example, be done by having administrative instances, like schedulers (also referred to as event core processes), associated to the event detectors of the different nodes 704 communicate with each other. Based on this communication they may decide to hand over event detector processes or algorithms thereof from one node to another node of the system 700.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted, configured or operable for performing a certain function, respectively. Hence, a "means for s.th." may as well be understood as a "means being adapted configured or operable to do s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

The invention claimed is:

1. An apparatus for transferring a first event detector process of a first node of a distributed computing system to a second event detector process of a second node of the distributed computing system, the second node being different from the first node, the apparatus comprising:
copying circuitry configured to copy process content of the first event detector process to the second event detector process from a memory of the first node to a memory of the second node;
coordination circuitry configured to coordinate input events of the first event detector process such that the input events of the first event detector process are processed in parallel at both the first and the second event detector processes;
verification circuitry configured to verify whether the input events of the first event detector process, which are processed in parallel at both the first and the second event detector processes, lead to identical output events at both the first and the second event detector processes, wherein the verification circuitry is configured to shut down the first event detector process in case the output events at both the first and the second event detector processes are identical, or to shut down the second event detector process in case the output events at both the first and the second event detector processes are not identical; and
circuitry configured to determine the second node among a set of possible nodes based on an optimal event detector process distribution criterion, wherein the optimal event detector process distribution criterion leads to one of a minimal overall delay of all events in the distributed computing system, a minimal variation of the load of a given node of the distributed computing system, or a minimal overall distributed computing system load.

2. The apparatus of claim 1, further comprising:
creation circuitry configured to create an instance corresponding to the first event detector process on the second node in order to obtain the second event detector process.

3. The apparatus of claim 2, wherein the creation circuitry is configured, after instantiating the second event detector process on the second node, to subscribe the second event detector process for identical input events as the first event detector process.

4. The apparatus of claim 1, wherein the copying circuitry is configured to freeze the process content of the first event detector at a predefined time instant and to copy the frozen process content from the memory of the first event detector process to the memory of the second event detector process.

5. The apparatus of claim 4, wherein the coordination circuitry is configured to process the input events of the first event detector process in parallel at both the first and the second event detector processes starting from the predefined time instant and based on the copied process content.

6. The apparatus of claim 1, wherein the copying circuitry is configured to copy process content iteratively from the memory of the first event detector process to the memory of the second event detector process, such that content which will not change during a remainder of the copying procedure is copied first.

7. The apparatus of claim 1, wherein the copying circuitry is configured to buffer the input events of the first event detector process during copying the process content.

8. The apparatus of claim 1, wherein an event detector process comprises a state machine and wherein the process content reflects a current state of the state machine.

9. A distributed computing system for determining events based on at least one sensor data stream, the distributed computing system comprising:

a plurality of distributed computing nodes; and an apparatus for transferring a first event detector process of a first node of the distributed computing system to a second event detector process of a second node of the distributed computing system, the apparatus comprising copying circuitry operable to copy a process content of the first event detector process to the second event detector process, coordination circuitry operable to coordinate input events of the first event detector process such that the input events of the first event detector process are processed in parallel at both the first and the second event detector processes, and verification circuitry operable to verify whether the input events of the first event detector process, which are processed in parallel at both the first and the second event detector process, lead to identical output events at both the first and the second event detector processes, wherein each of the plurality of distributed computing nodes comprises an apparatus for synchronizing a first event, having associated therewith a first event timing value based on a common clock signal, and a second event, having associated therewith a second event timing value based on the common clock signal, wherein the first and the second event experience different delays while travelling through different paths of the distributed computing system, and wherein at least one output event is to be determined by an event detector based on the first and the second event, the apparatus for synchronizing comprising:

a delay compensator associated to the event detector, the delay compensator having an input for receiving the first and the second event and having an output for forwarding relayed versions of the received first and second event to the associated event detector, wherein the delay compensator is operable to relay the first and the second event to the associated event detector based on the experienced delays and based on the associated first and second event timing values.

10. The distributed computing system of claim 9, wherein the delay compensator is operable to relay the first and the second event to the associated event detector such that a temporal order of the relayed versions of the received first and second event corresponds to an original temporal order of the first and the second event.

11. The distributed computing system of claim 9, wherein the delay compensator is operable to respectively relay the first and the second event such that a relative time difference between the relayed versions of the received first and second event corresponds to an original relative time difference between the first and the second event.

12. The distributed computing system of claim 9, wherein the delay compensator is operable to determine output time instances for relaying the first and the second event to the associated event detector based on the first and the event timing value and a common delay value.

13. The distributed computing system of claim 9, wherein the delay compensator is operable to determine an output time for relaying the first and the second event to the associated event detector based on the first and the second event timing value and a maximum event delay of the first and the second event.

14. The distributed computing system of claim 9, wherein the delay compensator is operable to determine event delays of the first and the second event, respectively, based on a reception time of the first or the second event at the delay compensator and their respective associated original event timing value.

15. A method for transferring a first event detector process of a first node of a distributed computing system to a second event detector process of a second node of the distributed computing system, the second node being different from the first node, the apparatus comprising:

copying process content of the first event detector process to the second event detector process;

coordinating input events of the first event detector process such that the input events of the first event detector process are processed in parallel at both the first and the second event detector processes;

verifying whether the input events of the first event detector process, which are processed in parallel at both the first and the second event detector processes, lead to identical output events at both the first and the second event detector processes;

shutting down the first event detector process in case the output events at both the first and the second event detector processes are identical, or, to shut down the second event detector process in case the output events at both the first and the second event detector processes are not identical; and determining the second node among a set of possible nodes based on an optimal event detector process distribution criterion, wherein the optimal event detector process distribution criterion leads to one of a minimal overall delay of all events in the distributed computing system, a minimal variation of the load of a given node of the distributed computing system, or a minimal overall distributed computing system load.

* * * * *